Figure 1:
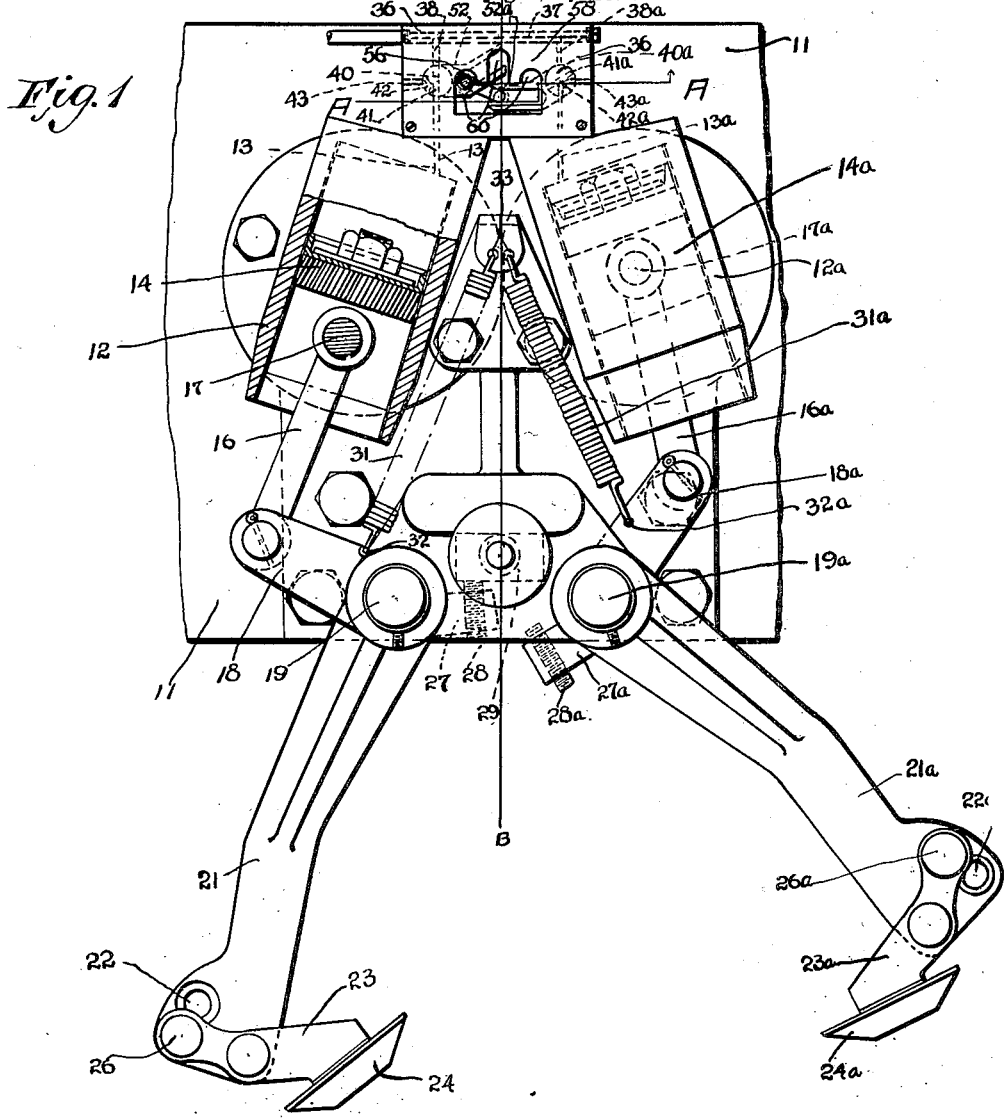

July 10, 1928.

J. A. SHIVELY 1,676,840

VALVE MECHANISM

Filed April 12, 1926

Inventor
Jess. A. Shively.

Attorney

Patented July 10, 1928.

1,676,840

UNITED STATES PATENT OFFICE.

JESS A. SHIVELY, OF AKRON, OHIO, ASSIGNOR TO THE GOODYEAR TIRE & RUBBER COMPANY, OF AKRON, OHIO, A CORPORATION OF OHIO.

VALVE MECHANISM.

Application filed April 12, 1926. Serial No. 101,346.

My invention relates to valve control mechanisms and it has particular relation to a control mechanism for operating a dual valve system. More specifically the invention relates to valve mechanisms such as are employed in conjunction with pneumatically operated stitcher elements of a tire building machine.

One object of my invention is to simplify the mode of operation of either or both of the stitcher arms of a tire building machine.

Another object of the invention is to provide a dual valve control device which is simple of construction and manipulation.

Many machines embody a plurality of mechanical elements, which are similar in all respects, and which may be operated independently, or simultaneously, according to the demand of circumstances. An example of such a structure is a tire building machine having a stitcher element disposed on each side of the core or mandrel.

The mechanism referred to finds employment in the manufacture of tires where a plurality of plies of rubberized fabric are superimposed about a mandrel and are made to conform therewith entirely free of any creases or folds. The initial part of the stitching operation may be performed on both sides of the core simultaneously, without undue danger of wrinkling the fabric. Toward the latter part of the operation, however, some difficulty may be experienced, and it is expedient, therefore, that the utmost care be observed. Frequently the tire builder finds it advisable to stitch but one edge of the ply at a time. To this end I have provided a control device, whereby either element may be operated independently of the other or both may be operated simultaneously.

A better understanding of the principles of the invention may be had by referring to the drawings, in which—

Figure 2:
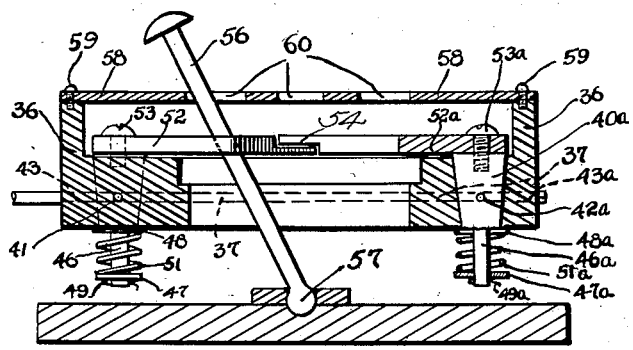

Fig. 1 is a plan view, partly broken, of a stitching device of a tire building machine, together with a valve control mechanism therefor constructed in accordance with my invention; and Fig. 2 is a sectional view, on an enlarged scale, of the valve control mechanism illustrated in Fig. 1, taken substantially along the line A—A.

In addition to a frame in which a core or mandrel is rotatably mounted, a tire building machine includes a stitcher carriage, which embodies, among other instrumentalities a pair of stitcher elements. The carriage is adapted to reciprocate in the plane of the mandrel described by line B—B in Fig. 1.

In the drawings, a base plate 11 of the carriage has mounted thereon two independent stitching mechanisms. Since the construction and operation of the mechanisms are identical, it will be necessary to describe but one of the units, understanding of course that whatever is said of one mechanism applies to the other. The reference characters denoting elements in one mechanism are the same as those denoting corresponding elements in the other, except that in the latter case the suffix "a" has been added.

An air cylinder 12 having a single fluid passage 13 is rigidly mounted upon the base plate 11 of the carriage and is disposed at an angle with respect to the plane of the mandrel, which is indicated by the line B—B. A piston 14 of any conventional design reciprocates within the cylinder and is pivotally secured to one end of a connecting rod 16 by a wrist pin 17. The other end of the rod is similarly secured to an arm 18 of a bell crank which is pivoted about a vertical stud shaft 19 that is disposed in the plate 11. The opposite arm 21 of the bell crank is provided with a plurality of openings 22. Adjacent these openings is pivoted a lever 23 which supports at one of its ends a rotatable stitching disc 24. A pin 26 is vertically disposed and slidably mounted in the other end of the lever and is urged downwardly by a spring member (not shown). The pin is adapted to fit into the openings 22 in the arm and thereby fixes the angle which the stitching disc makes with the mandrel. To change its position necessitates pulling the pin upwardly against the force of the spring and swinging the lever whereby the pin may engage the proper opening when released. In order to show the relative location of the openings, the arms 23 and 23ª are illustrated in different positions.

Near the fulcrum of the bell crank and rigidly joined thereto is a lug 27 having a threaded opening, wherein a set screw 28 is lodged. The screw is adapted to engage a butt plate 29 which is secured to the base plate and which defines one limit of travel of the stitching arm. In order to return the stitching arm to its normally inoperative position a spring 31 has been provided, one end of which is joined to the arm 18 of the bell crank at 32, while the other end is connected to a projected portion of the base plate at 33.

Secured to the air cylinder casting is a dual valve mechanism, which embodies a metallic block or seat 36, having a manifold 37, which supplies fluid under pressure from a source (not shown) to the cylinder by way of a pipe 38. Seated in the valve block is a valve plug 40 having two conduits 41 and 42 therein. One of its conduits 41 is directed diametrically through the plug, and is adapted to interconnect the fluid passage 13, which leads to the cylinder, to the manifold duct. The other channel, which is in no way connected with the former, makes an obtuse angle therein, as indicated by numeral 42. When in normal position, it interconnects the passage 13 with a short channel 43, which discharges to the atmosphere.

A stem portion 46 extends from the base of the plug, and is provided with two washer plates 47 and 48 which are maintained thereon by a cotter pin 49 that passes through the stem at its lower extremity. The washers are separated by a spring member 51, which is under slight compressive stress. Accordingly, the lower washer is urged against the pin 49 by the spring, and thereby maintains the valve plug in a seated position.

A bifurcated arm 52 is secured to the top of the plug by a screw 53. It extends in the direction of a similar or complementary arm that is mounted on the other valve plug and overlaps a portion thereof, as indicated by numeral 54, but does not engage therewith.

A lever 56, which is joined to the base plate by a ball and socket joint 57, extends upwardly and is contained within the bifurcated portion of the arms. Its movement is limited by a guard member 58 that is secured to the upper portion of the valve seat by screws 59. It will be noted that the guard includes a slot having three branches 60 wherein the lever may be moved to engage either of the arms independently or both jointly. It should likewise be observed that when the lever is moved back into the main slot, the arms of the valves are returned to their normal position.

From the description of the construction of the structure it will readily be apparent that the stitcher arm is normally maintained in inoperative position with respect to the core of the tire building machine, the stitcher arm designated by the reference character 21ᵃ being shown in that position. The valve plug 40ᵃ is then in such position that it interconnects the air chamber of the cylinder 12ᵃ with the exhaust port or to the atmosphere. The tension of the spring member 31ᵃ under these conditions, is sufficient to retract the stitching arm, and maintain it in inoperative position.

In order to actuate the stitching arm, the lever 56 is shifted into the slot on the right side of the guard member 58. The valve plug will have been rotated into a position in which it connects the manifold 37 to the cylinder chamber. Simultaneously the discharge duct 42 will have been swung out of alignment with the exhaust port. As the pressure builds up in the cylinder 12 it forces the piston outwardly, and swings the stitching arm 21 into engagement with the core. Its movement in this direction is limited by the set screw 28 and abutting block 29. After the stitching operation has been completed, the lever is drawn backwardly, whereby the admission port to the cylinder is closed and the air in the chamber is permitted to exhaust into the atmosphere by way of duct 43. Subsequently the spring member 31 pulls the arm away from the core. Needless to state, whenever both of the stitching arms can be employed simultaneously, they can be actuated by moving the lever into the middle slot, wherein it engages both of the bifurcated members, and thus opens both valves simultaneously.

This invention makes possible a rapid manual control of either or both of the stitching arms. The mechanism is not complicated, nor is it likely to be damaged. From the description it will be appreciated by those skilled in the art that although I have set forth but a single embodiment of the principles of the invention, as applied to tire building machines, they are capable of many modifications which fall within its spirit and scope. I desire, therefore, that it be construed only to accord with the prior art and the appended claims.

What I claim is:

1. In a tire machine, a pair of stitcher arms, individual pneumatic means for operating the arms, individual control valves for said means, means for operating the valves independently or simultaneously comprising a triple acting valve actuating means adapted to actuate either valve independently or both valves simultaneously.

2. In a tire building machine having complementary pneumatically operated elements, valve mechanisms for controlling the operation of the elements, each including an oscillatory member for interconnecting the supply of fluid having an arm joined thereto, and a movable member for actuating the arm of either valve independently or both simultaneously.

3. In a tire building machine having complementary pneumatically operated elements, each provided with a valve mechanism having a plug for interconnecting adjacent fluid passages and an arm joined to the plug, a universally pivoted operating lever, and a triple way guard member adapted to guide the lever into engagement with either arm independently of the other or both simultaneously.

4. In a tire building machine having complementary pneumatically operated elements, a dual valve mechanism comprising two valve plugs each adapted to interconnect admission and discharge fluid passages and each having an arm extending therefrom, and an operating lever having a ball and socket joint adapted to engage and actuate either one or both of the arms.

5. In a tire building machine having complementary pneumatically operated elements, a dual valve mechanism comprising two resiliently mounted valve plugs each adapted to interconnect admission and discharge fluid passages and each actuated through an arm joined to the plug, by a universally pivoted lever whose points of engagement with the arm are defined by a tri-directional slotted guard member.

6. In a tire building machine having complementary pneumatically operated elements, valve mechanisms for controlling the operation of the elements, each comprising a three way valve plug resiliently mounted and adapted to interconnect admission and discharge fluid passages, a bifurcated arm member joined to the plug and in cooperative relation with the corresponding arm on the other valve of the complementary plug, a guard member having a plurality of slots and a lever universally pivoted and adapted to swing within the bifurcated portion of the arm member and the slots of the guard.

7. In a tire building machine having complementary pneumatically operated elements, valve mechanisms for controlling the operation of the elements, each comprising a three way valve adapted to interconnect admission and discharge fluid passages resiliently maintained in operative relation and an arm joined to the plug and in contiguous alignment with its complementary arm on the other plug, a slotted guard member and a universally pivoted lever guided by the slotted guard and adapted to actuate either of the arm members independently or both simultaneously.

8. A stitcher mechanism for a tire making machine comprising a support, a pair of stitcher arms pivoted to the support, a pair of compression cylinders secured to the support, pistons in the cylinders, links connecting the pistons to the stitcher arms and valve means having fluid conduits communicating with the cylinders adapted to admit fluid under pressure to the cylinders simultaneously or to either cylinder individually.

9. A stitcher mechanism for tire making machines comprising a support, a pair of stitcher arms pivoted to the support, and fluid pressure means adapted to operate the arms simultaneously or to operate either arm individually.

In witness whereof, I have hereunto signed my name.

JESS A. SHIVELY.